United States Patent
Wells

(10) Patent No.: US 7,380,853 B2
(45) Date of Patent: Jun. 3, 2008

(54) CRASH APPROPRIATE VEHICLE PARTITION

(76) Inventor: James Wells, 3473 Exmouth La., Tallahassee, FL (US) 32317

( * ) Notice: Subject to any disclaimer, the term of this patent is extended or adjusted under 35 U.S.C. 154(b) by 0 days.

(21) Appl. No.: 10/536,107

(22) PCT Filed: May 23, 2005

(86) PCT No.: PCT/US2005/017917

§ 371 (c)(1),
(2), (4) Date: Nov. 17, 2006

(87) PCT Pub. No.: WO2005/115795

PCT Pub. Date: Dec. 8, 2005

(65) Prior Publication Data

US 2007/0228756 A1 Oct. 4, 2007

(51) Int. Cl.
*B60R 21/08* (2006.01)
(52) U.S. Cl. .................. 296/24.4; 296/24.43; 280/749
(58) Field of Classification Search ............... 296/24.4, 296/24.42, 24.43, 24.46, 24.3; 280/749
See application file for complete search history.

(56) References Cited

U.S. PATENT DOCUMENTS

| | | | | |
|---|---|---|---|---|
| 3,931,994 A | * | 1/1976 | Palmiter | 296/24.4 |
| 4,621,856 A | * | 11/1986 | McKenzie | 296/24.4 |
| 5,340,183 A | * | 8/1994 | Horian | 296/24.4 |
| 5,735,564 A | * | 4/1998 | Coogan | 296/24.43 |
| 5,820,187 A | * | 10/1998 | Ament et al. | 296/24.43 |
| 5,906,410 A | * | 5/1999 | Dalinkiewicz | 296/24.4 |
| 6,004,084 A | * | 12/1999 | Moker | 410/118 |
| 6,059,313 A | * | 5/2000 | Coogan et al. | 280/749 |
| 6,554,339 B1 | * | 4/2003 | Moore | 296/24.43 |
| 6,827,382 B2 | * | 12/2004 | Murray et al. | 296/24.46 |
| 6,983,969 B2 | * | 1/2006 | Murray et al. | 296/24.4 |
| 6,983,970 B2 | * | 1/2006 | Bateman | 296/24.43 |
| 7,195,297 B2 | * | 3/2007 | Murray et al. | 296/24.4 |
| 7,213,856 B2 | * | 5/2007 | Katada | 296/24.43 |

* cited by examiner

*Primary Examiner*—Dennis H. Pedder
*Assistant Examiner*—Greg Blankenship
(74) *Attorney, Agent, or Firm*—William H. Hollimon

(57) ABSTRACT

A crash worthy vehicle partition for securely separating the front of a vehicle from the rear of vehicle. The vehicle partition includes upper mounting brackets and lower mounting brackets that allow for limited, rearward motion of the vehicle parrition in the event of a rear-end collision to reduce the crash impact forces on front seat occupants. The vehicle partition further includes pivotable wings that are disposed on each side of the vehicle partition in a vehicle's side curtain airbag deployment zones. These pivota+e wings are mechanically retracted out of the side curtain airbag; deployment zones in the event of an airbag deployment event.

11 Claims, 6 Drawing Sheets

CRASH APPROPRIATE VEHICLE PARTITION

TECHNICAL FIELD

The present invention pertains to a crash appropriate vehicle seat partition. Specifically, the present invention is directed to a vehicle seat partition that does not interfere with the movement of vehicle front seats in the event of a rear-end collision, that otherwise does not pose a hazard to front seat occupants in the event of such a collision, and that does not restrict deployment of side curtain airbags in an airbag deployment event.

BACKGROUND ART

Current vehicle partitions are typically formed from rigid materials and attached to the interior of a vehicle in a rigid fashion. These partitions typically serve several functions, such as separating front seat passengers from rear seat passengers in police cars and taxi cabs, and separating front seat passengers from cargo in the rear of station wagons and vans. Generally, these partitions are composed of two parts, an upper section that is typically constructed to allow visibility between the front and the rear of a vehicle and a lower section that is solidly formed from sheet steel. Visibility is provided by constructing the upper section using wire mesh, screen, or clear plastic material. These partitions are usually supported around the partition's perimeter by a frame that is rigidly attached to the vehicle body at the floor, at the vehicle's B or C pillar, and sometimes along the vehicle roof These partitions are often marketed as providing additional support in the event of a vehicle rollover.

These current partitions have many limitations, particularly when applied to more recent vehicle designs. While these partitions effectively keep rear passengers and cargo segregated from front seat occupants, their rigid nature substantially increases the likelihood that front seat occupants will suffer additional injury in vehicle collisions. Specifically, vehicle front seats that are designed to collapse upon rear-end collision, and thereby absorb some of the crash force, are prevented from collapsing because of the rigid barrier behind the seat. Additionally, front seat occupants also can incur direct head injuries caused by striking the partition in the event of a collision. Finally, rigid partitions prevent or interfere with the timely and correct deployment of side curtain airbags that are located above or beside these partitions.

Thus, the need exists for a vehicle partition that effectively isolates the front of a vehicle from the rear of a vehicle without comprising the safety of the front seat occupants in the event of a collision, or preventing the normal operation of safety equipment such as side curtain airbags installed in a vehicle.

DISCLOSURE OF INVENTION

It is a the main object of the present invention to provide a vehicle partition that does not interfere with the normal operation of safety systems and equipment installed in vehicles—such as collapsible front seats and side curtain airbags. It is another object of the present invention to provide a vehicle partition that otherwise provides safe, secure isolation of the rear of the vehicle from the front of the vehicle.

More specifically, the vehicle partition includes a two-piece partition that forms a barrier between the front of a vehicle, and rear passengers and cargo. The bottom half of the partition is formed from a rigid, solid material such as sheet steel, and the top half of the partition is formed from materials that allow for visibility between the front and rear of a vehicle, such as a clear structural plastic material. The top half of the partition is provided with wings that are mechanically retractable in the event of a side curtain airbag deployment. The brackets that secure the partition to the vehicle allow for a limited, rearward range of motion of the partition if the vehicle front seats impact the partition in the event of a rear-end collision.

These and other features, aspects, and advantages of the present invention will become better understood with regard to the following description, appended claims, and accompanying drawings wherein:

BEST MODE FOR CARRYING OUT THE INVENTION

It is to be understood that given the teachings of the invention in this patent application, one of ordinary skill in the related art will be able contemplate these and similar implementations of the elements of the invention.

Figure 1:
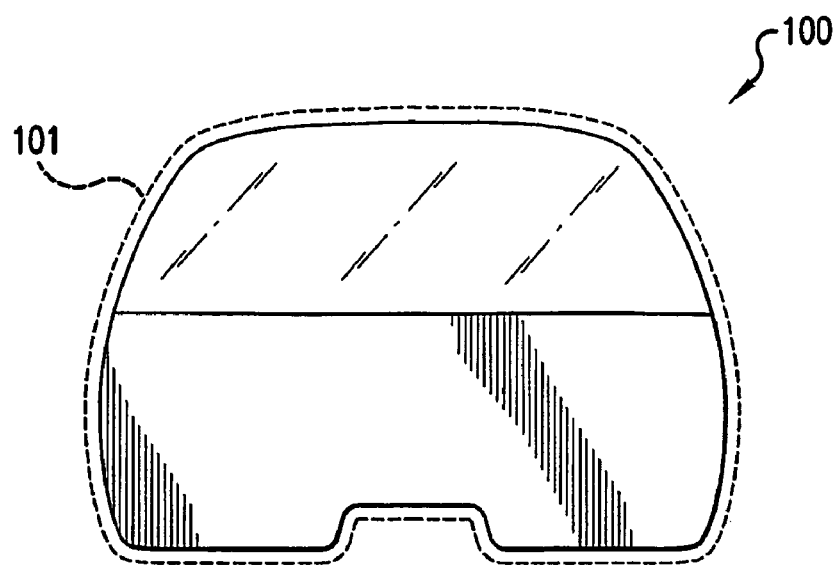
FIG. 1 is a front view of representative prior art.

Referring to FIG. 1, a typical, prior-art partition is shown. This partition is composed of a bottom half, typically constructed of steel plate, and a top half, typically constructed of a clear, rigid plastic material. The sides of the partition top half are contoured to match the inner cross section of the receiving vehicle and thereby eliminate any gaps between the top sides of the partition and the sides of the vehicle. Alternatively, some existing partitions employ side panels (not shown) that are fixedly attached to a partition to conform the partition shape to the interior cross section of a receiving vehicle.

Figure 2:
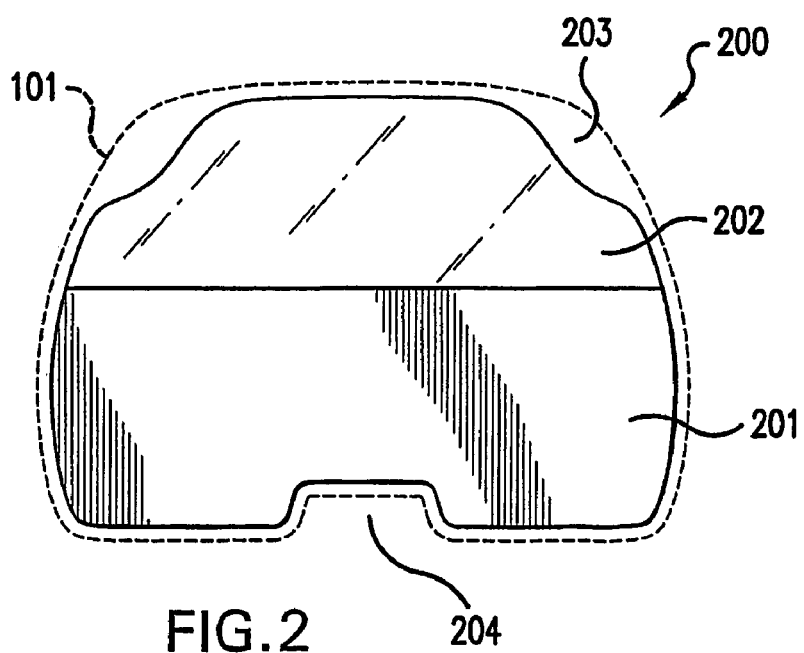
FIG. 2 is a front view of the present invention.

FIG. 2 shows a front view of the present invention. Partition 200 is comprised of a lower half 201 formed from sheet steel or other strong, rigid, structural material that is disposed behind the front passenger seats of a vehicle. Top half 202 is rigidly connected to bottom half 201 and is constructed of lexan, unbreakable glass, a heavy gauge metal screen, or a combination of these materials. Top half 202 is contoured on its sides to create a side curtain airbag deployment zone 203 on each side of top half 202. Side curtain airbag deployment zone 203 is sufficiently large to allow full deployment of a side curtain airbag, without interfering with such deployment.

Figure 3A:
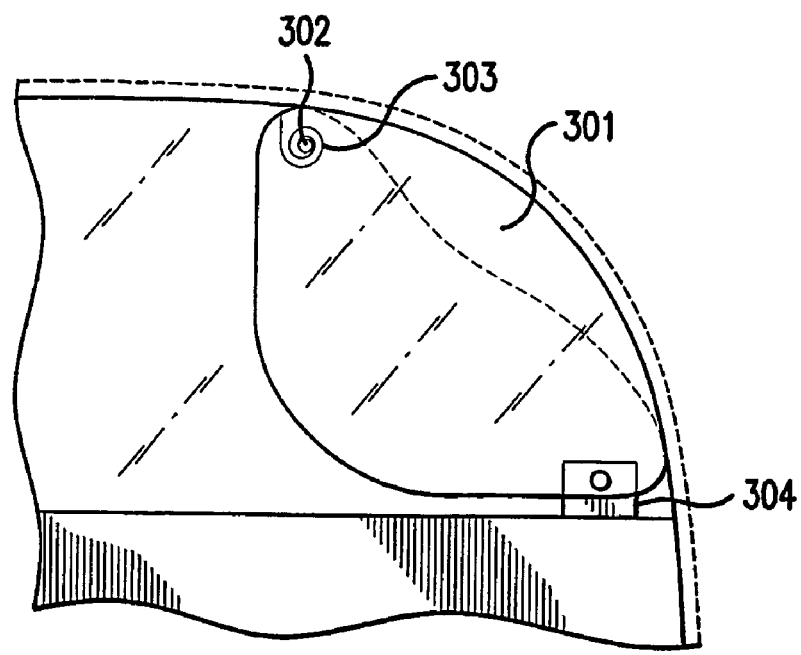
FIG. 3A is a partial front view of one embodiment of the present invention in normal position.
Figure 3B:
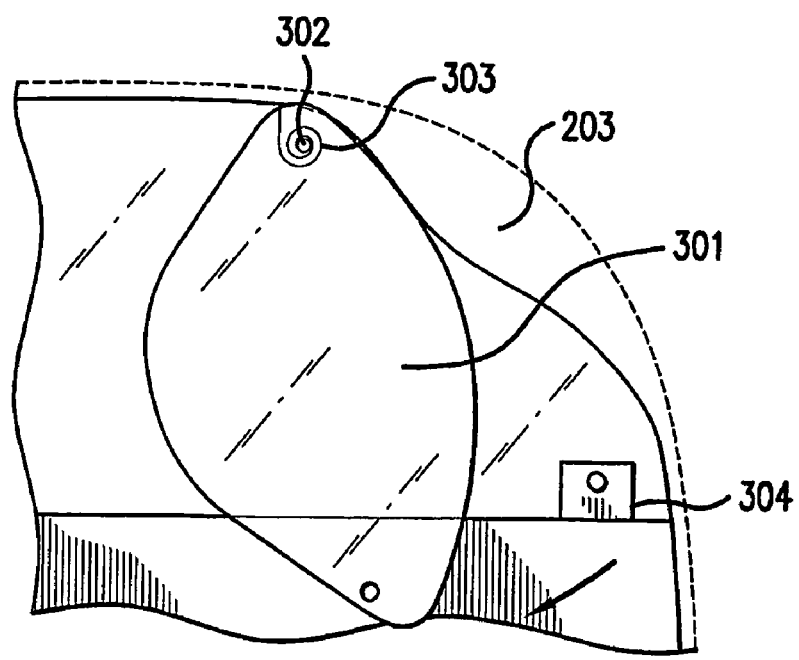
FIG. 3B is a partial front view of one embodiment of the present invention in the retracted position.

Referring to FIGS. 3A and 3B, an embodiment of the present invention is shown. Wing 301 is shown in its normal position (FIG. 3A) and in its retracted position (FIG. 3B). Wing 301 is constructed of materials similar to top half 202, or may be constructed from sheet steel or other rigid material. Wing 301 is pivotably connected to top half 202 by pivot 302. Pivot 302 is a pinned connection located near the top of top half 202 at the portion of top half 202 that is in close proximity to a vehicle's roof and side. Pivot 302 allows pivoting of wing 301 in the event of a side curtain airbag deployment. Wing 301 is contoured such that, in its normal position, side curtain airbag deployment zone 203 is fully obstructed. Wing 301 is also held in its normal position by solenoid 304 which has a retractable pin that selectively engages a receiving connection on wing 301. Solenoid 304 is in communication with a vehicle's airbag deployment system (not shown). Spring 303 is located at pivot 302 and provides sufficient urging force to quickly pivot wing 301 out of side curtain airbag deployment zone 203 in the event of a side curtain airbag deployment. In a crash event that is recognized by a vehicle's airbag deployment system as sufficient for airbag deployment, the deployment signal from the airbag deployment system is communicated to solenoid 304. Upon receipt of the deployment signal, the retractable pin of solenoid 304 retracts, freeing wing 301 to pivot about pivot 302 upon the urging of spring 303. This retraction of wing 301 clears side curtain airbag deployment zone 203 and allows for full deployment of a vehicle's side curtain air bags. As shown in FIG. 3B, upon retraction, side curtain airbag deployment zone 203 is unrestricted by wing 301.

It can be seen that wings 301 could alternatively pivot from the bottom portion of wings 301, or could slide vertically, horizontally, or diagonally in response to an airbag deployment signal to clear side curtain airbag deployment zone 203. It should be readily understood by those skilled in the art that FIGS. 3A and 3B, for clarity purposes, shows only one wing 301, and that a second, mirror-image wing 301 is employed on the opposing side of partition 200.

Figure 4A:
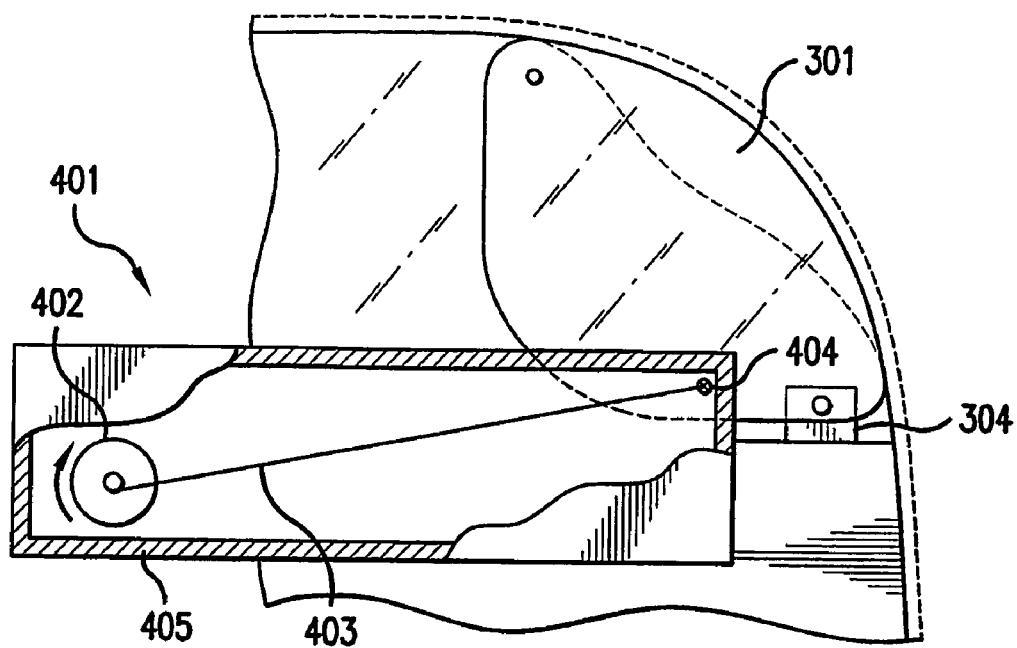
FIG. 4A is a partial front view of one embodiment of the present invention in the normal position.
Figure 4B:
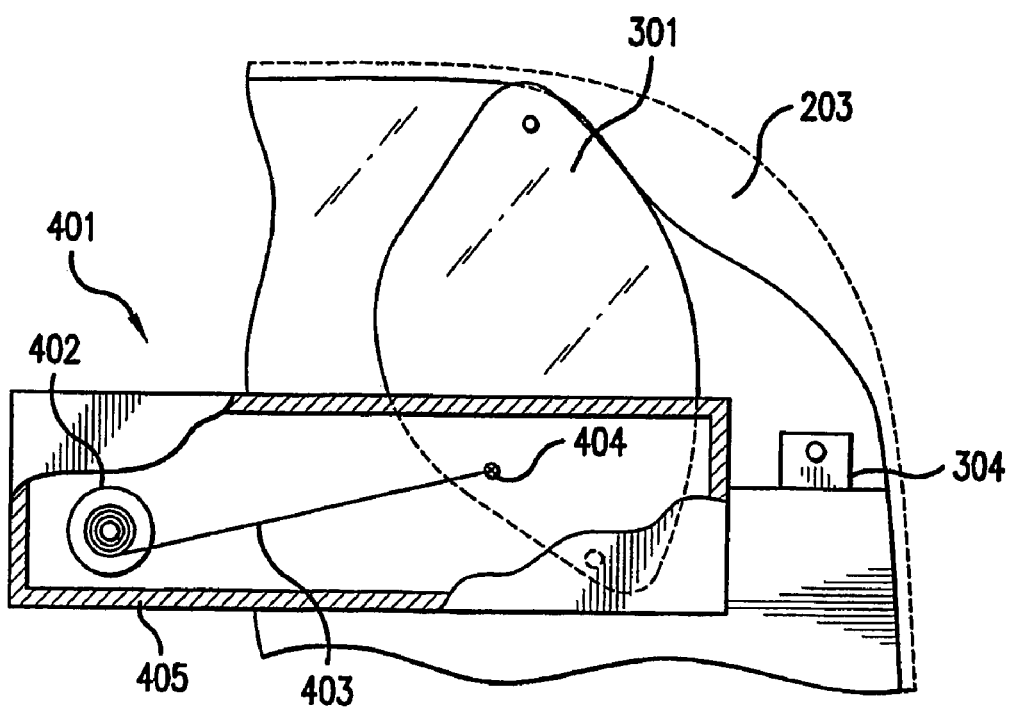
FIG. 4B is a partial front view of one embodiment of the present invention in the retracted position

Referring to FIGS. 4A and 4B, a preferred embodiment of a system to retract wing 301 in the event of side curtain airbag deployment is shown. In this embodiment, retraction system 401 causes wing 301 to pivot about pivot 302 in the event of a side curtain airbag deployment. Retraction system 401 is comprised of a pyrotechnic retractor 402, retracting cable 403, retracting cable connector 404, and retractor system housing 405. Retractor 402 is a reel-type uptake device, is in communication with a vehicle's airbag deployment system (not shown), and is a standard pyrotechnic type device used to provide seat belt retraction in many vehicles. As shown in FIG. 3A, in the normal position, wing 301 completely fills side curtain airbag deployment zone 203.

In an airbag deployment event, solenoid 304 and retractor 402 receive a signal from a vehicle's airbag deployment system. Upon receipt of this signal, solenoid 304 retracts its pins freeing wing 301 to pivot about pivot 302. Retractor 402 fires, tensioning retracting cable 402, and retracting wing 301 into the retracted position shown in FIG. 4B. As shown in FIG. 4B, the retraction of wing 301 by retraction system 401 allows a complete deployment of a side curtain airbag into side curtain airbag deployment zone 203. Alternatively, retractor 402 may be a solenoid with a retractable pin with sufficient throw to retract wing 301 into its retracted position. Retracting system 401 is enclosed in housing 405 to prevent tampering or accidental damage caused by movement of persons or cargo. It should be readily understood by those skilled in the art that FIGS. 4A and 4B, for clarity purposes, shows only one wing 301, and that a second, mirror-image wing 301 and retraction system 401 are employed on the opposing side of partition 200.

Figure 5A:
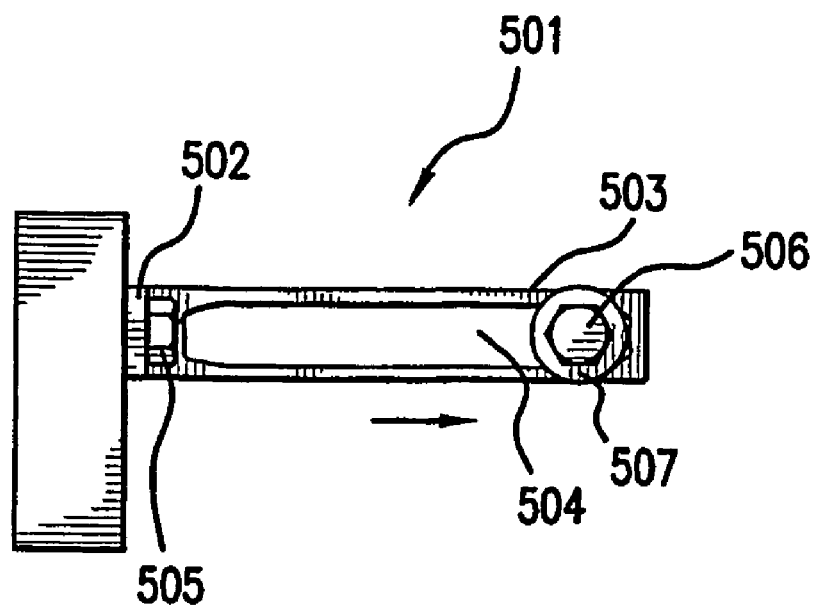
FIG. 5A is a side view of a top mounting bracket of the present invention in the normal position.
Figure 5B:
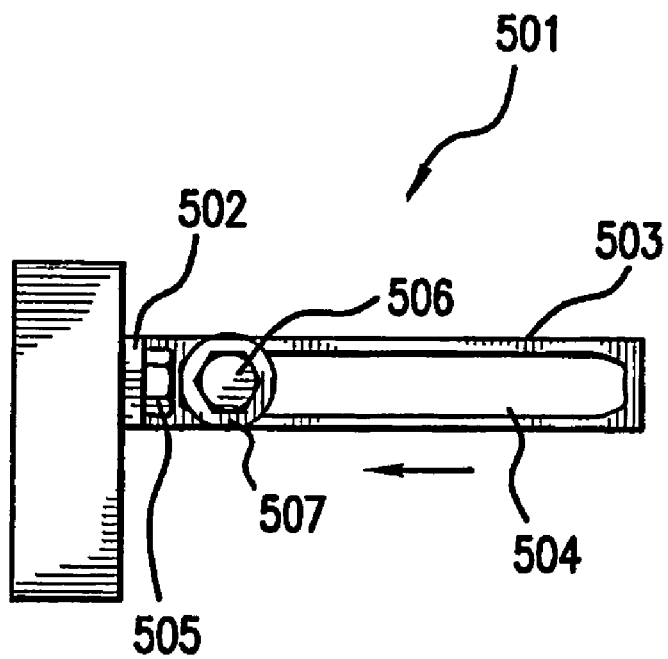
FIG. 5B is a side view of a top mounting bracket of the present invention in the rearward position.

Referring to FIGS. 5A and 5B, top mounting bracket 501 is shown in the normal position (FIG. 5A) and in the position following a rear-end collision event (FIG. 5B). Top mounting bracket 501 is used to secure partition 200 to a vehicle at a vehicle's B or C pillar. Top mounting bracket 501 is constructed of steel, or other suitable structural material, and is generally L-shaped, with a first leg 502 attachable to partition 200, and a second leg 503, attachable to a vehicle. Partition bolt 505 may be used to attach top mounting bracket 501 to partition 200, or alternatively, clamps, rivets, braising, or welding may be used to attach bracket 501 to partition 200. Second leg 503 includes slot 504, through which frame bolt 506 is insertable. Frame bolt 506 is slidably engaged in slot 504. Sliding of frame bolt 506 in slot 504 is controlled by the amount of torque applied to frame bolt 506 and the coefficient of friction between washer 507 and long leg 503. Sufficient torque is supplied to frame bolt 506 such that sliding of frame bolt 506 in slot 504 only occurs when the resultant forces from a rear-end collision would collapse a vehicle's front seats (not shown). As can be readily seen, the amount of rearward travel of frame bolt 506 in slot 504 is limited by the overall length of slot 504. Alternatively, the length of rearward travel of frame bolt 506 may be modified by changing the length of slot 504, by employing multiple, overlapping sliding elements, by using a shear bolt in combination with a tether attached between the partition 200 and the frame of a vehicle, or by using multiple links pinned links.

Figure 6:
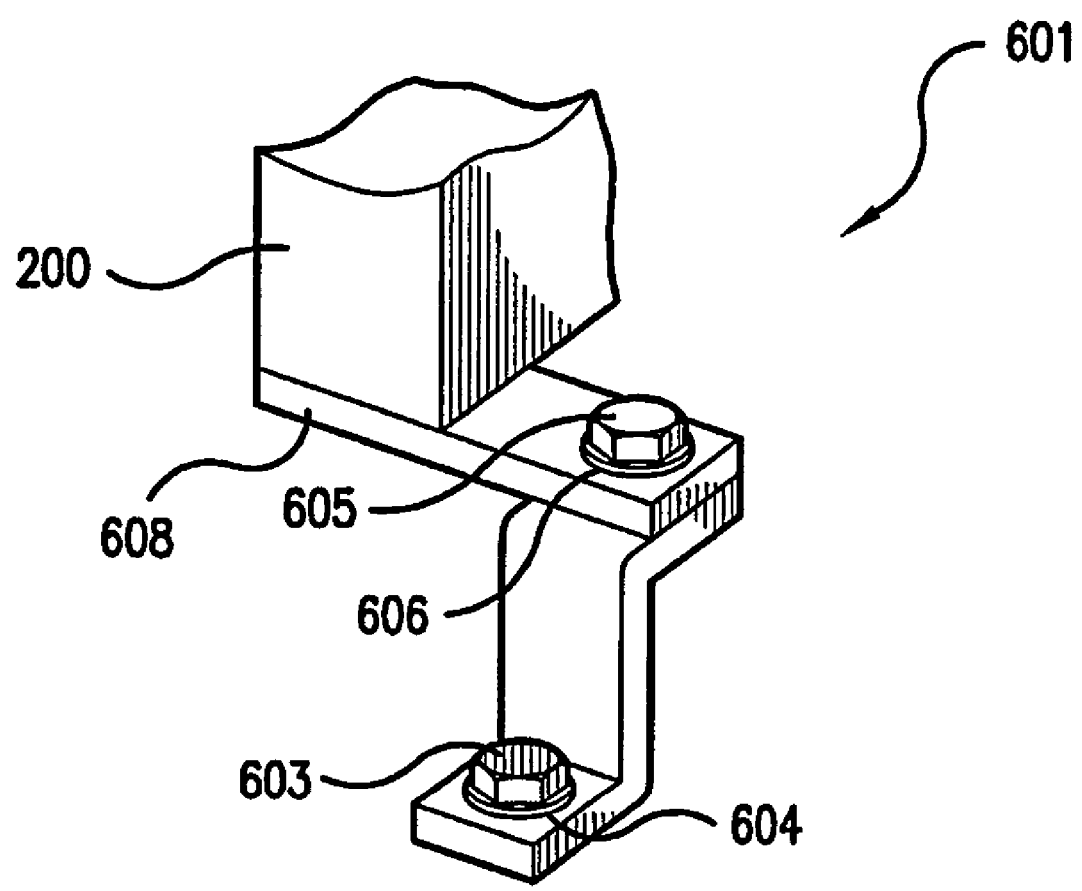
FIG. 6 is an isometric view of a bottom mounting bracket of the present invention.

Referring to FIG. 6, an isometric view of bottom mounting bracket 601 attached to partition 200. Bottom mounting bracket 601 is "S" shaped and constructed from steel or other suitable structural material. Vehicle bolt 603 and vehicle bolt washer 604 secure the lower end of bottom mounting bracket 601 to a vehicle's floor. Alternatively, bottom mounting bracket 601 may be configured to connect to a structural side rail in close proximity to a vehicle's floor. Partition mounting arm 608 extends from the bottom of partition 200 and is connected to bottom mounting bracket 601 by partition bolt 605 and partition washer 606. As shown in FIG. 6, partition 200 is cantilevered off of bottom mounting bracket 608. This cantilevered form allows bending of partition mounting arm 608 and movement of the top of partition 200 in a rear-end collision event Alternatively, partition 200 could be connected to bottom mounting bracket with a hinged or pivotable connection.

Figure 7:
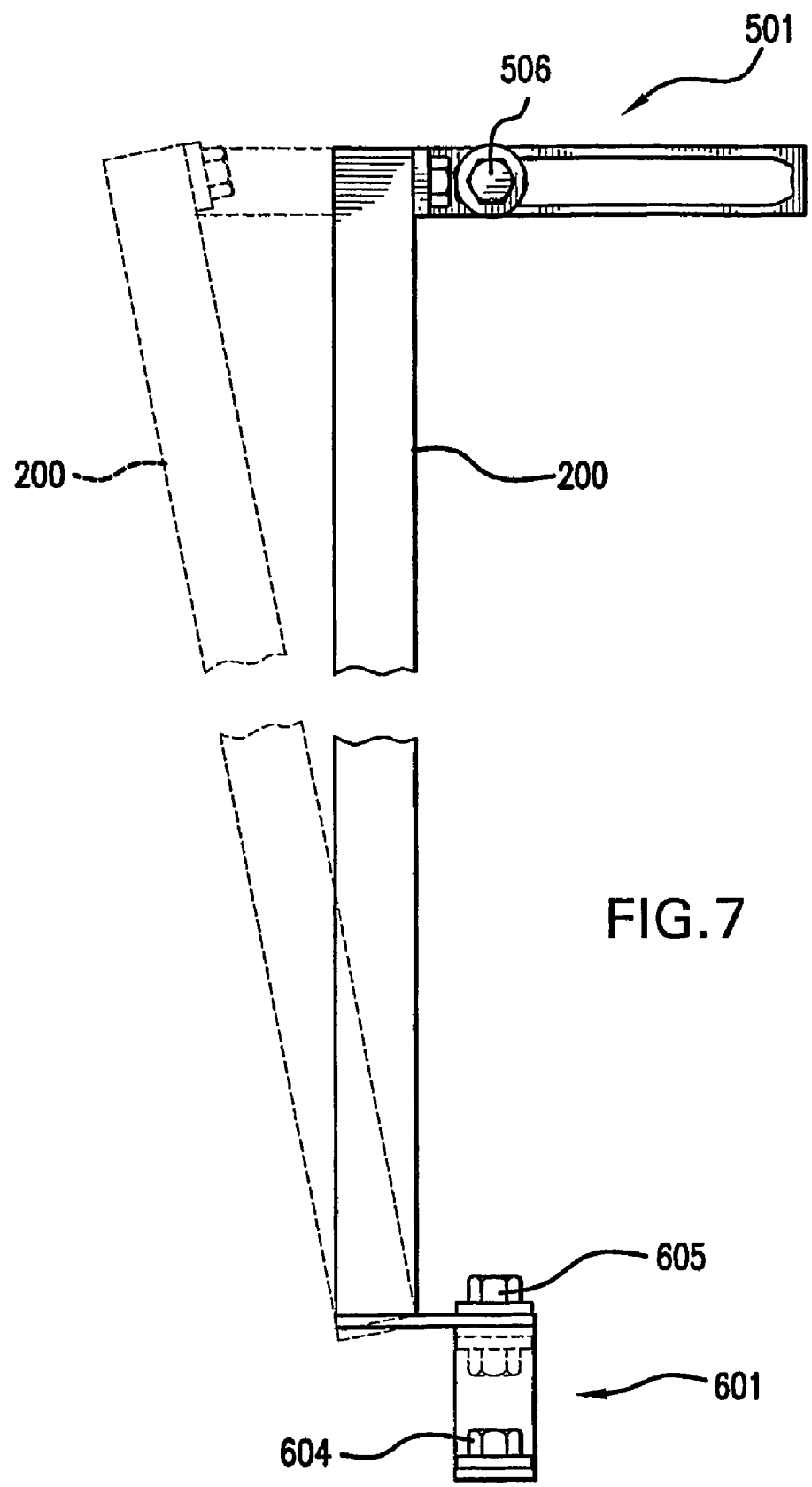
FIG. 7 is side view of the partition of the present invention in its normal and rearward positions.

Referring to FIG. 7, partition 200 is shown in its normal position (solid line) and in its deformed position (broken line) following a rear-end collision event. In the deformed position, top mounting bracket 501 and partition 200 slide rearward and this rearward travel is stopped by bolt 506. At the bottom of partition 200, partition mounting arm 608 deforms to accommodate the rearward movement of the top of partition 200.

Although the illustrative embodiments of the present invention have been described herein with reference to the accompanying drawings, it is to be understood that the invention is not limited to those precise embodiments, and that various other changes and modifications may be affected by one skilled in the art without departing from the scope or spirit of the invention. All such changes and modifications are intended to be included within the scope of the invention as defined by the appended claims.

INDUSTRIAL APPLICABILITY

The vehicle partition of the present invention offers numerous advantages. First, it provides a secure separation of a vehicle front from a vehicle rear without hindering or preventing the deployment of side curtain airbags. Next it provides a rigid partition that is capable of limited rearward movement in the event of front seat collapse in the event of a rear-end collision. This rearward movement allows for vehicle front seats to collapse and absorb some of the forces generated in a rear-end collision event. Next, it easily integrates into existing vehicles, and accommodates different airbag system designs.

What is claimed is:

1. A vehicle partition for a vehicle having an airbag deployment system comprising:
   a. a rigid screen adapted to be mounted between a front of a vehicle and a rear of said vehicle;
   b. a pair of lower mounting brackets adapted to connect a lower half of said screen to said vehicle;
   c. a pair of upper mounting bracket adapted to connect a top half of said screen to said vehicle;
   d. a pair of retractable wings, one of said pair of retractable wings disposed on each side of said screen in a side curtain airbag deployment zone; and
   e. wherein said one of said pair of retractable wings is configured to automatically retract when said airbag deployment system deploys a side curtain airbag thereby allowing sufficient clearance for said side curtain airbag to deploy into said side curtain airbag deployment zone.

2. The vehicle partition of claim 1 wherein said pair of lower mounting brackets includes means for allowing limited, rearward movement of said screen in the event of a rear-end collision.

3. The vehicle partition of claim 1 wherein said pair of upper mounting brackets includes means for allowing limited, rearward movement of said screen in the event of a rear-end collision.

4. The vehicle partition of claim 1 wherein each of said pair of retractable wings is pivotably connected to said upper half of said screen with a pin.

5. The vehicle partition of claim 1, further comprising a pyrotechnic retractor configured to actuate retraction of said one of said pair of retractable wings upon receipt of a signal from said airbag deployment signal.

6. A vehicle partition for a vehicle having a cabin with a ceiling, a floor and a driver seat having a seat back comprising:
   a. a rigid screen adapted to be mounted between a front of said vehicle and a rear of said vehicle rearward of said driver seat, said rigid screen having a top portion proximate said ceiling of said cabin and a bottom portion proximate said floor of said cabin;
   b. a pair of lower mounting brackets adapted to connect a lower half of said screen to said vehicle, said pair of lower mounting brackets including means for allowing limited, rearward movement of said screen in a rear-end collision event;
   c. a pair of upper mounting bracket adapted to connect a top half of said screen to said vehicle, said pair of upper mounting brackets including means for allowing limited, rearward movement of said screen in said rear-end collision event; and
   d. wherein said pair of lower mounting brackets and said pair of upper mounting brackets together are configured to allow said top portion of said screen to pivot about said pair of lower mounting brackets toward said rear of said vehicle in said rear-end collision event thereby allowing the rearward travel of said seat back of said driver seat during said rear-end collision event.

7. The vehicle partition of claim 6 further including a pair of retractable wings, one of said pair of retractable wings disposed on each side of said screen in a side curtain airbag deployment zone.

8. The vehicle partition of claim 7 further including means for retracting said pair of retractable wings.

9. The vehicle partition of claim 8 further including means for communicating with an airbag deployment system in said vehicle.

10. The vehicle partition of claim 7, wherein said one of said pair of retractable wings is configured to automatically retract when an airbag deployment system deploys a side curtain airbag thereby allowing sufficient clearance for said side curtain airbag to deploy into said side curtain airbag deployment zone.

11. The vehicle partition of claim 10, further comprising a pyrotechnic retractor configured to actuate retraction of said one of said pair of retractable wings upon receipt of a signal from said airbag deployment signal.

* * * * *